United States Patent
Roesch et al.

(10) Patent No.: US 12,466,731 B2
(45) Date of Patent: Nov. 11, 2025

(54) METHOD AND APPARATUS FOR CO-GENERATING ELECTRICITY IN A PROCESS PLANT INTEGRATED WITH A THERMAL POWER GENERATOR USING FEEDWATER

(71) Applicant: L'Air Liquide Société Anonyme pour l'Etude et l'Exploitation des Procédés Georges Claude, Paris (FR)

(72) Inventors: Alexander Roesch, Butzbach (DE); Teja Schmid McGuinness, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 545 days.

(21) Appl. No.: 17/993,229

(22) Filed: Nov. 23, 2022

(65) Prior Publication Data
US 2023/0167748 A1 Jun. 1, 2023

(30) Foreign Application Priority Data

Nov. 26, 2021 (EP) .................................. 21020600

(51) Int. Cl.
C01B 3/56 (2006.01)
C01B 3/34 (2006.01)
(52) U.S. Cl.
CPC ............ *C01B 3/56* (2013.01); *C01B 3/34* (2013.01); *C01B 2203/0233* (2013.01);
(Continued)

(58) Field of Classification Search
CPC ..... C01B 3/56; C01B 3/34; C01B 2203/0233; C01B 2203/042; C01B 2203/0894; C01B 2203/84
See application file for complete search history.

(56) References Cited

U.S. PATENT DOCUMENTS

| 2013/0213489 A1* | 8/2013 | Von Trotha | F01K 23/10 122/421 |
| 2020/0018192 A1* | 1/2020 | Dumur | F01K 23/10 |
| 2023/0114501 A1* | 4/2023 | Christensen | C01B 3/48 423/652 |

FOREIGN PATENT DOCUMENTS

| EP | 2 103 568 | 9/2009 |
| WO | WO 2021 197854 | 10/2021 |

OTHER PUBLICATIONS

European Search Report and Written Opinion for corresponding EP 21020600, May 29, 2022.

* cited by examiner

*Primary Examiner* — Shafiq Mian
(74) *Attorney, Agent, or Firm* — Elwood L. Haynes

(57) ABSTRACT

A method for co-generating electricity in a process plant using feedwater, where the process plant is integrated with a thermal power generator, is provided. The method includes obtaining a pressurized stream of hot feedwater from a feedwater generation unit of the process plant; compressing the pressurized stream of hot feedwater by pumping and splitting the pressurized stream of hot feedwater to obtain a first stream of feedwater and a second stream of feedwater; routing the second stream of feedwater to the thermal power generator; cooling the second stream of feedwater against a process fluid that is used in the thermal power generator to generate a heat in the thermal power generator and to obtain (Continued)

a cooled second stream of feedwater; and co-generating the electricity, using the thermal power generator integrated with the process plant, using the heat.

20 Claims, 15 Drawing Sheets

(52) U.S. Cl.
CPC ............................ *C01B 2203/042* (2013.01); *C01B 2203/0894* (2013.01); *C01B 2203/84* (2013.01)

METHOD AND APPARATUS FOR CO-GENERATING ELECTRICITY IN A PROCESS PLANT INTEGRATED WITH A THERMAL POWER GENERATOR USING FEEDWATER

CROSS REFERENCE TO RELATED APPLICATIONS

This application claims the benefit of priority under 35 U.S.C. § 119 (a) and (b) to European Patent Application No. 21020600.9, filed Nov. 26, 2021, the entire contents of which are incorporated herein by reference.

TECHNICAL FIELD

The present disclosure relates generally to co-generation of electricity, more specifically, the present disclosure relates to a method and an apparatus for efficient co-generation of electricity in a process plant that is integrated with a thermal power generator, using feedwater.

BACKGROUND

Globally, the majority of hydrogen is generated by the means of a steam methane reforming process. In the steam methane reforming process, synthesis gas is generated by reforming hydrocarbon feedstock and is subsequently shifted to a water gas shift reactor to produce a shifted gas stream. To purify the hydrogen from the shifted gas stream, other components such as water, methane, carbon monoxide, carbon dioxide, or nitrogen need to be removed and typically a pressure swing adsorption (PSA) purification unit is installed in a process plant for this. Prior the separation of hydrogen, hot shift gas stream needs to be cooled down to a temperature level of approximately 40° C. before entering the PSA purification unit. The sensible heat of the synthesis gas leaving a steam reformer and the shifted gas leaving the water gas shift reactor is typically recovered by the production of steam or preheating of other process streams such as hydrocarbon feed stream, boiler feedwater, or demineralized water. However, a portion of the sensible heat from the synthesis gas cannot be recovered and is finally cooled by air coolers or cooling water coolers. This portion of sensible heat is basically lost energy and cannot be recovered.

Typically, power generators have been integrated into the process plants for utilizing the lost energy. However, small size power generators are expensive for the amount of power generated by the power generators, Hence, commercial application is often not justified considering the total investment and operating cost.

Some existing approaches use an organic Rankine cycle power generation system to utilize aforesaid waste heat to generate electricity. For example, published European patent application EP 2103568 A2 proposes to recover heat from steam reforming gas streams using a Rankine cycle heat engine to generate power, wherein the Rankine cycle heat engine uses a working fluid like propane, butane, pentane, ethylene, propylene, lithium bromide in water and mixtures thereof.

The power generation system receives heat from the organic fluid that is heated using syngas as a heat source. Then, preheated organic fluid is vaporized using a vaporizer. The vaporized organic fluid is expanded through a turbine system to generate electricity. However, the electrical efficiency of aforesaid power generation system is rather low compared to traditional electrical power generating systems and cost of such system are also high.

Furthermore, the cost of the integration of such power generation system into the process plants is also high. Typically, a separate heat exchanger is installed in a syngas heat recovery section, preferably downstream of a CO shift stage (shift gas cooler), for cooling a syngas stream to a lower temperature syngas stream and preheat a cold-water stream. The preheated water stream provides the necessary heat to operate the power generation system, A water circulation system with a pump is required for circulating the cold-water stream and preheated water stream, Hence, to extract the heat necessary for the operation of the power generator system, an additional heat exchanger, heat exchanger, e. g., shift gas cooler, and the water circulation system with pump are required. These additional equipment items and associated piping increase the installation cost to a level that such an integration is commercially not justified.

The biggest disadvantages of the power generation system in the context of the process plants are high cost of the power generation systems and high installation cost of such power generation systems into the process plants.

Therefore, there is a need to address the aforementioned technical drawbacks in existing known technologies in order to improve co-generation of electricity in the process plant by using low-grade or low-temperature heat from process streams.

SUMMARY

The present disclosure seeks to provide an approach for improving co-generation of electricity in a process plant by utilizing a minimum number of additional equipment with minimum impact on design of the process plant. An aim of the present disclosure is to provide a solution that overcomes at least partially aforesaid problems encountered in prior art and provide an improved method and apparatus for co-generating electricity in a process plant that is integrated with a thermal power plant by routing a portion of a pressurized feedwater to the thermal power generator for supplying heat to the thermal power generator. The object of the present disclosure is achieved by solutions provided in the herewith-appended independent claims.

Advantageous implementations of the present disclosure are further defined in the herewith-appended dependent claims.

According to a first aspect, the present disclosure provides a method for co-generating electricity in a process plant using feedwater, wherein the process plant is integrated with a thermal power generator, wherein the method comprises:
  obtaining a pressurized stream of hot feedwater from a feedwater generation unit of the process plant;
  compressing the pressurized stream of hot feedwater by pumping and splitting the pressurized stream of hot feedwater to obtain a first stream of feedwater and a second stream of feedwater;
  routing the second stream of feedwater to the thermal power generator;
  cooling the second stream of feedwater against a process fluid that is used in the thermal power generator to generate a heat in the thermal power generator and to obtain a cooled second stream of feedwater; and
  co-generating the electricity, using the thermal power generator integrated with the process plant, using the heat.

The method for co-generating electricity in the process plant according to present disclosure is of advantage in that the method provides an improved process for integration of the thermal power generator with the process plant by routing the second stream of feedwater to the thermal power generator to supply heat for electricity co-generation. Such improved process of integration leads to elimination of additional equipment, namely a shift gas cooler and a circulation pump for integration of the thermal power generator, thereby lowering an installation cost and an operational cost.

According to a second aspect, the present disclosure provides a method for co-generating electricity in a process plant using feedwater, where the process plant is integrated with a thermal power generator, the method comprises;

obtaining a pressurized stream of hot feedwater from a feedwater generation unit of the process plant;

compressing the pressurized stream of hot feedwater by pumping and splitting the pressurized stream of hot feedwater to obtain a first stream of feedwater and a second stream of feedwater, wherein the first stream of feedwater is routed to a preheater;

routing the second stream of feedwater to the thermal power generator;

cooling the second stream of feedwater against a process fluid that is used in the thermal power generator to generate a heat in the thermal power generator and to obtain a cooled second stream of feedwater;

co-generating the electricity, using the thermal power generator integrated with the process plant, using the heat;

mixing at least a portion of the cooled second stream of feedwater with the first stream of feedwater to obtain a mixed stream of feedwater;

preheating the mixed stream of feedwater using a hot synthesis gas stream to obtain a preheated mixed stream of feedwater; and routing the preheated mixed stream of feedwater to the thermal power generator for heat transfer and for electricity generation.

The method for co-generating electricity in the process plant according to present disclosure is of advantage in that the method provides an improved process for integration of the thermal power generator with the process plant by routing the second stream of feedwater to the thermal power generator to supply heat for electricity co-generation. Further, the method enables efficient cogeneration of electricity by utilizing heat from the preheated mixed stream of feedwater. Such improved process of integration leads to elimination of additional equipment, namely a shift gas cooler and a circulation pump for integration of the thermal power generator, thereby lowering an installation cost and an operational cost.

Additional embodiments of the present disclosure are capable of eliminating the aforementioned drawbacks in existing known approaches for co-generating electricity in a process plant using feedwater. The advantage of the embodiments according to the present disclosure is that the embodiments provide an improved process for integrating the thermal power plant with the process plant by eliminating requirement of an additional shift gas cooler as well as a circulation pump in the process plant, thus lowers an installation cost and an operational cost.

Additional aspects, advantages, features and objects of the present disclosure are made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. To illustrate the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, the same elements have been indicated by identical numbers. Embodiments of the present disclosure will now be described, by way of example only, with reference to the following diagrams wherein.

DETAILED DESCRIPTION OF EMBODIMENTS

Figure 1:
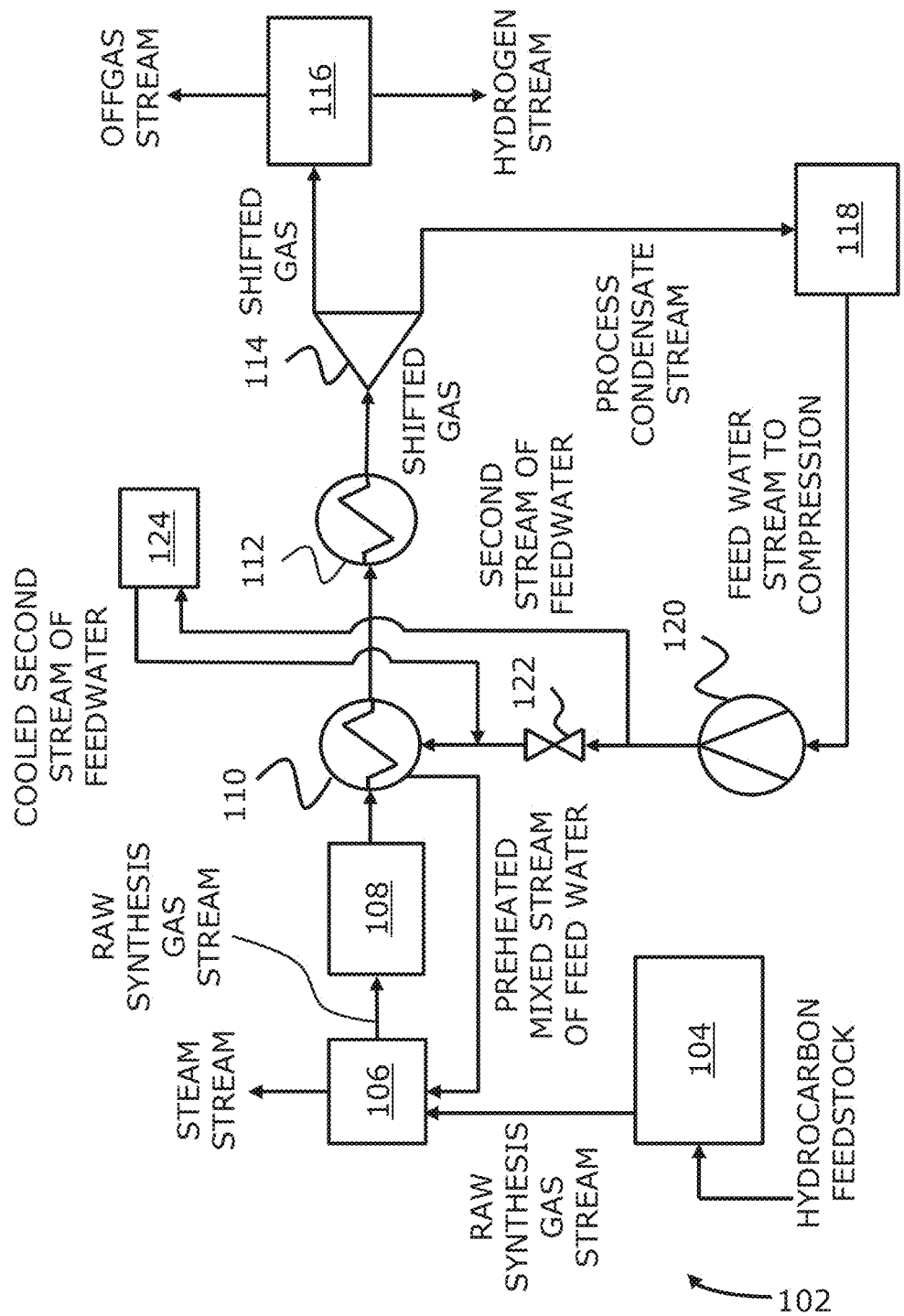
FIG. 1 is a schematic illustration of an apparatus for co-generating electricity in a process plant using feedwater according to an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, the present disclosure provides a method for co-generating electricity in a process plant using feedwater, wherein the process plant is integrated with a thermal power generator, wherein the method comprises: obtaining a pressurized stream of hot feedwater from a feedwater generation unit of the process plant; compressing the pressurized stream of hot feedwater by pumping and splitting the pressurized stream of hot feedwater to obtain a first stream of feedwater and a second stream of feedwater; routing the second stream of feedwater to the thermal power generator; cooling the second stream of feedwater against a process fluid that is used in the thermal power generator to generate a heat in the thermal power generator and to obtain a cooled second stream of feedwater; and co-generating the electricity, using the thermal power generator integrated with the process plant, using the heat.

The apparatus for co-generating electricity in the process plant according to present disclosure is of advantage in that the method provides an improved process for integration of the thermal power generator with the process plant by routing the second stream of feedwater to the thermal power generator to supply heat for electricity co-generation. Such improved process of integration leads to elimination of additional equipment, namely a shift gas cooler and a circulation pump for integration of the thermal power generator, thereby lowering an installation cost and an operational cost.

The method for co-generating electricity in a process plant using feedwater has less impact on the design of the process plant.

Optionally, the thermal power generator includes a heater for heating and vaporizing the process fluid using heat of the feedwater, a turbine for extracting thermal energy from the vaporized process fluid and rotating an output shaft using the thermal energy, an electric power generator that is connected with the turbine, for generating electricity, a cooler for cooling the process fluid, and a pump for circulating the process fluid within the thermal power generator.

Optionally, the second stream of feedwater includes a temperature of approximately 105° C.

Optionally, the method includes mixing at least a portion of the cooled second stream of feedwater with the first stream of feedwater to obtain a mixed stream of feedwater; preheating the mixed stream of feedwater using a hot synthesis gas stream to obtain a preheated mixed stream of feedwater; and routing the preheated mixed stream of feedwater to a steam generator of the process plant.

Optionally, the method includes routing a portion of the cooled second stream of feedwater to the steam generator of the process plant without prior additional heating being used.

Optionally, the method includes preheating the first stream of feedwater using the hot synthesis gas stream to obtain a preheated first stream of feedwater that is routed to the steam generator.

Optionally, the method includes preheating the first stream of feedwater using a hot flue gas stream that is obtained from a combustion process of the thermal power generator.

Optionally, the hot synthesis gas stream is generated by a steam methane reformer. The steam methane reformer may generate the hot synthesis gas stream at a temperature typically between 750° C.-950° C.

Optionally, the hot synthesis gas stream is generated by an autothermal reformer. The autothermal reformer may generate the hot synthesis gas stream at a temperature typically between 850° C.-1500° C.

Optionally, the hot synthesis gas stream is generated by a partial oxidation (POX) process. The POX process may generate the hot synthesis gas stream at a temperature typically between 850° C.-1500° C.

Optionally, the hot synthesis gas is generated by any combination of the aforesaid synthesis gas generation methods.

Optionally, the method includes sending at least a portion of the cooled second stream of feedwater to the feedwater generation unit of the process plant.

Optionally, the method includes re-utilizing at least a portion of the cooled second stream of feedwater within a reforming process of the thermal power generator.

Optionally, the method includes admixing at least a portion of the cooled second stream of feedwater upstream in a pump that provides feedwater compression.

Optionally, the method includes sending at least a portion of the preheated first stream of feedwater to the thermal power generator for performing heat transfer.

Optionally, the pressurized stream of hot feedwater is split into a first portion and a second portion. Optionally, the method further includes sending the first portion to the thermal power generator for heat transfer and to obtain the cooled second stream of feedwater; and mixing the cooled second stream of feedwater with the second portion prior to compression.

Optionally, the method includes re-mixing the cooled second stream of feedwater with the pressurized stream of hot feedwater, or (b) sending back the cooled second stream of feedwater to the feedwater generation unit.

Optionally, the method includes (i) importing the pressurized stream of hot feedwater to the reforming process from an external feedwater generation unit; and (ii) sending at least a portion of the pressurized stream of hot feedwater to the thermal power generator for heat transfer.

Optionally, the method includes (i) importing the preheated first stream of feedwater, having a lower pressure than the pressurized stream of hot feedwater, to the reforming process, and (ii) sending at least a portion of the preheated first stream of feedwater to the thermal power generator for heat transfer.

Optionally, the method includes preheating the cooled second stream of feedwater, having a lower pressure than the pressurized stream of hot feedwater, using either (a) the hot synthesis gas stream or (b) the hot flue gas stream to obtain a preheated stream; importing the preheated stream to the reforming process; and sending at least a portion of the preheated stream to the thermal power generator for heat transfer.

Optionally, the method includes (i) importing the cooled second stream of feedwater, having a lower pressure than the pressurized stream of hot feedwater, to the reforming process, and (ii) reducing a temperature of a synthesis gas outlet connected to a demineralized water preheater to a level suitable for a pressure swing adsorption process.

Optionally, the method includes (i) importing the cooled second stream of feedwater, having a lower pressure than the pressurized stream of hot feedwater, to the reforming process, and (ii) using at least a portion of the cooled second stream of feedwater obtained from the thermal power generator for final cooling of the hot synthesis gas stream.

Optionally, the method includes utilizing a hot process stream for supplying heat to the thermal power generator before the pressurized stream of hot feedwater is preheated again.

According to a second aspect, the present disclosure provides a method for co-generating electricity in a process plant using feedwater, wherein the process plant is integrated with a thermal power generator, wherein the method comprises: obtaining a pressurized stream of hot feedwater from a feedwater generation unit of the process plant; compressing the pressurized stream of hot feedwater by pumping and splitting the pressurized stream of hot feedwater to obtain a first stream of feedwater and a second stream of feedwater, wherein the first stream of feedwater is routed to a preheater; routing the second stream of feedwater to the thermal power generator; cooling the second stream of feedwater against a process fluid that is used in the thermal power generator to generate a heat in the thermal power generator and to obtain a cooled second stream of feedwater; co-generating the electricity, using the thermal power generator integrated with the process plant, using the heat; mixing at least a portion of the cooled second stream of feedwater with the first stream of feedwater to obtain a mixed stream of feedwater; preheating the mixed stream of feedwater using a hot synthesis gas stream to obtain a preheated mixed stream of feedwater; and routing the preheated mixed stream of feedwater to the thermal power generator for heat transfer and for electricity generation.

The method for co-generating electricity in the process plant using feedwater is of advantage in that the method enables lowering an installation cost and an operation cost by eliminating additional equipment for integrating the thermal power generator to the process plant.

Optionally, the process plant is a synthesis gas production plant that is integrated with the thermal power generator for electricity generation.

Embodiments of the present disclosure substantially eliminate or at least partially address the aforementioned technical drawbacks in existing technologies in improving electricity co-generation process by routing a portion of a pressurized feedwater with a temperature of approximately 105° C. to a thermal power generator to provide heat to the power generator. The feedwater stream returning from the thermal power generator has a lower temperature and may be mixed with the remaining pressurized feedwater in downstream of a feedwater flow control valve prior to preheating in the preheater.

FIG. 1 is a schematic illustration of an apparatus 102 for co-generating electricity in a process plant using feedwater according to an embodiment of the present disclosure. The apparatus 102 includes a syngas generator 104, a steam generator 106, a water gas shift reactor 108, a preheater 110, a syngas cooler 112, a condensate separator 114, a hydrogen recovery unit 116, a feedwater generation unit 118, a pump 120, a control valve 122, and a thermal power generator 124. The syngas generator 104 receives hydrocarbon feedstock and produces a raw synthesis gas stream. The raw synthesis gas stream may be generated at a temperature typically between 750° C.-950° C. for steam reforming and 850° C.-1500° C. for autothermal reforming (ATR) or a partial oxidation (POX) process. The steam generator 106 receives the raw synthesis gas stream and cools the raw synthesis gas stream, thereby producing a cooled syngas stream and a steam stream. The water gas shift reactor 108 receives the cooled syngas stream and shifts the cooled syngas stream by converting at least a portion of carbon monoxide (CO) and water ($H_2O$) into hydrogen ($H_2$) and carbon dioxide ($CO_2$), thus obtaining a shifted synthesis gas. The preheater 110 receives the shifted synthesis gas (hot synthesis gas stream) and cools the shifted synthesis gas, thereby obtaining a cooled shifted synthesis gas. The syngas cooler 112 further cools the cooled shifted synthesis gas and provides the cooled shifted synthesis gas to the condensate separator 114. The condensate separator 114 separates a process condensate stream (liquid condensate) from the cooled shifted synthesis gas before directing the latter to the hydrogen recovery unit 116 and provides the process condensate stream to the feedwater generation unit 118. The hydrogen recovery unit 116 produces an offgas stream as well as a hydrogen stream from the cooled shifted synthesis gas. The hydrogen recovery unit 116 may be a pressure swing absorption (PSA) hydrogen recovery unit. The feedwater generation unit 118 produces a feedwater stream from the process condensate stream. The feedwater generation unit 118 may be a deaerator to remove dissolved gases from the process condensate stream. The feedwater generation unit 118 may also comprise a fresh water supply. The fresh water supplied to the feedwater generation unit 118 may be demineralized water.

The pump 120 obtains a pressurized stream of hot feedwater from the feedwater generation unit 118. The pump 120 compresses and/or conveys the pressurized stream of hot feedwater by pumping and splitting the pressurized stream of hot feedwater to obtain a first stream of feedwater and a second stream of feedwater. The first stream of feedwater is routed to the preheater 110 via the control valve 122. Optionally, the split between the first and second stream of feedwater is adjusted by setting the control valve 122 accordingly. The second stream of feedwater is routed to the thermal power generator 124 and cooled against a process fluid that is used in the thermal power generator 124 to generate a heat in the thermal power generator 124 and to obtain a cooled second stream of feedwater. The electricity is co-generated, using the thermal power generator 124 integrated with the process plant using the heat. Optionally, the thermal power generator 124 is a Rankine cycle power generator.

Optionally, a portion of the cooled second stream of feedwater is mixed with the first stream of feedwater to obtain a mixed stream of feedwater. The mixed stream of feedwater is preheated in preheater 110, using the hot synthesis gas stream leaving the water gas shift reactor 108, to obtain a preheated mixed stream of feedwater and routed to the steam generator 106, The first stream of feedwater may be preheated using the hot synthesis gas stream to obtain a preheated first stream of feedwater that is routed to the steam generator 106. Optionally, the first stream of feedwater may be preheated using a hot flue gas stream that is obtained from a combustion process of the thermal power generator 124.

Figure 2:
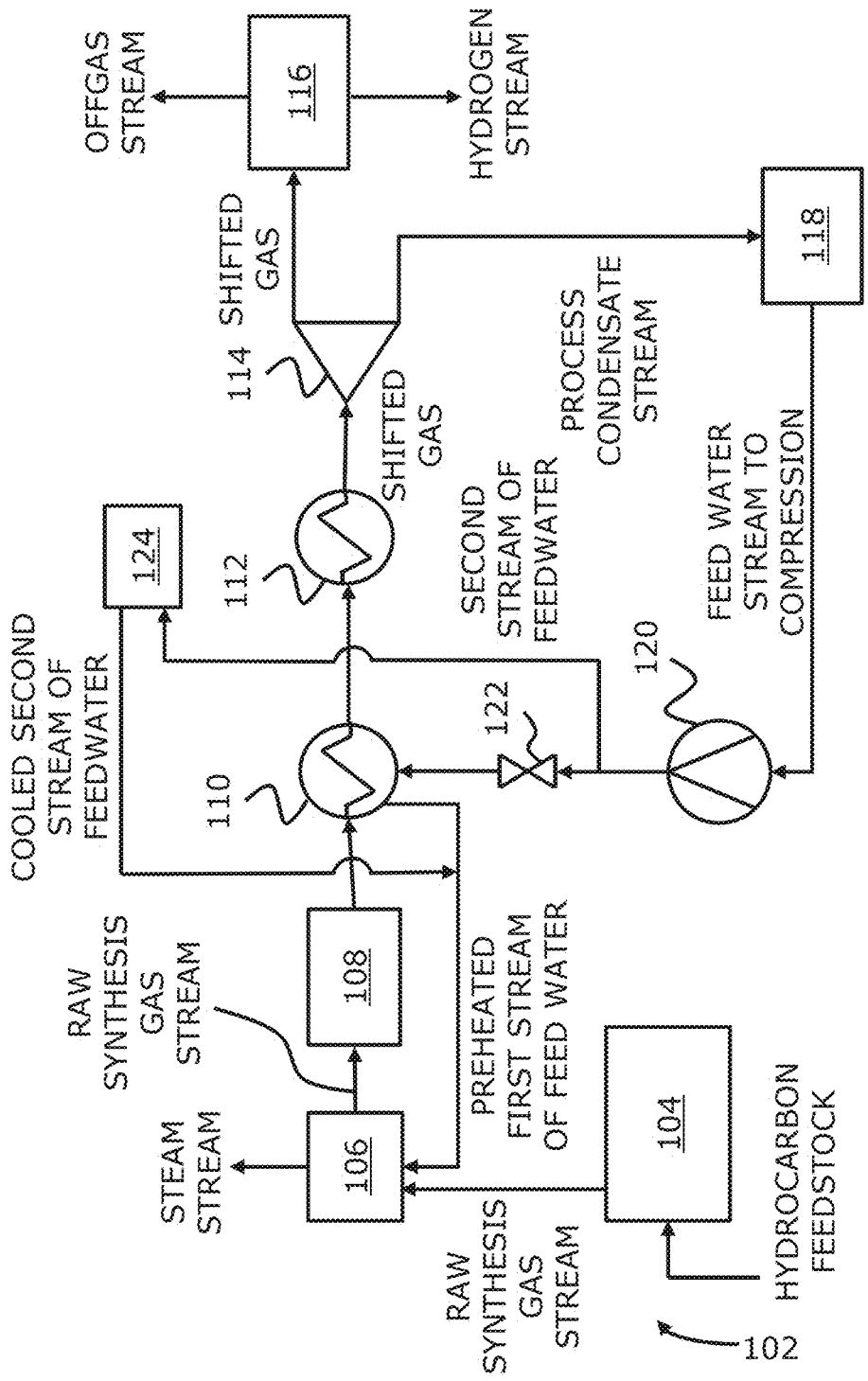
FIG. 2 is a schematic illustration of a first configuration of the apparatus of FIG. 1 for co-generating electricity in a process plant using feedwater according to an embodiment of the present disclosure.

Optionally, the hot synthesis gas stream is generated by a steam methane reformer, an autothermal reformer or a partial oxidation (POX) process, FIG. 2 is a schematic illustration of a first configuration of the apparatus 102 of FIG. 1 for co-generating electricity in a process plant using feedwater according to an embodiment of the present disclosure. In the first configuration, the apparatus 102 is configured to obtain the pressurized stream of hot feedwater from the feedwater generation unit 118 of the process plant. The apparatus 102 is configured to compress and/or convey the pressurized stream of hot feedwater by pumping and splitting the pressurized stream of hot feedwater to obtain the first stream of feedwater and the second stream of feedwater. The apparatus 102 routes the second stream of feedwater to the thermal power generator. The apparatus 102 cools the second stream of feedwater against the process fluid that is used in the thermal power generator to produce heat in the thermal power generator for co-generating the electricity and to obtain the cooled second stream of feedwater. The apparatus 102 routes the cooled second stream of feedwater directly towards the steam generator 106 without prior additional heating being used. The first stream of feedwater may be preheated in preheater 110 using the hot synthesis gas stream to obtain a preheated first stream of feedwater that is routed to the steam generator 106.

FIGS. 3A-F are schematic illustrations of a second configuration of the apparatus 102 of FIG. 1 for co-generating electricity in a process plant using feedwater according to an embodiment of the present disclosure. In the second configuration of FIGS. 3A-E, the apparatus 102 is configured to obtain the pressurized stream of hot feedwater from the feedwater generation unit 118 of the process plant. The apparatus 102 compresses and/or conveys the pressurized stream of hot feedwater by pumping and splitting the pressurized stream of hot feedwater to obtain the first stream of feedwater and the second stream of feedwater. The apparatus 102 routes the second stream of feedwater to the thermal power generator. The apparatus 102 cools the second stream of feedwater against the process fluid that is used in the thermal power generator to produce heat in the thermal power generator for co-generating the electricity and to obtain the cooled second stream of feedwater.

Figure 3A:
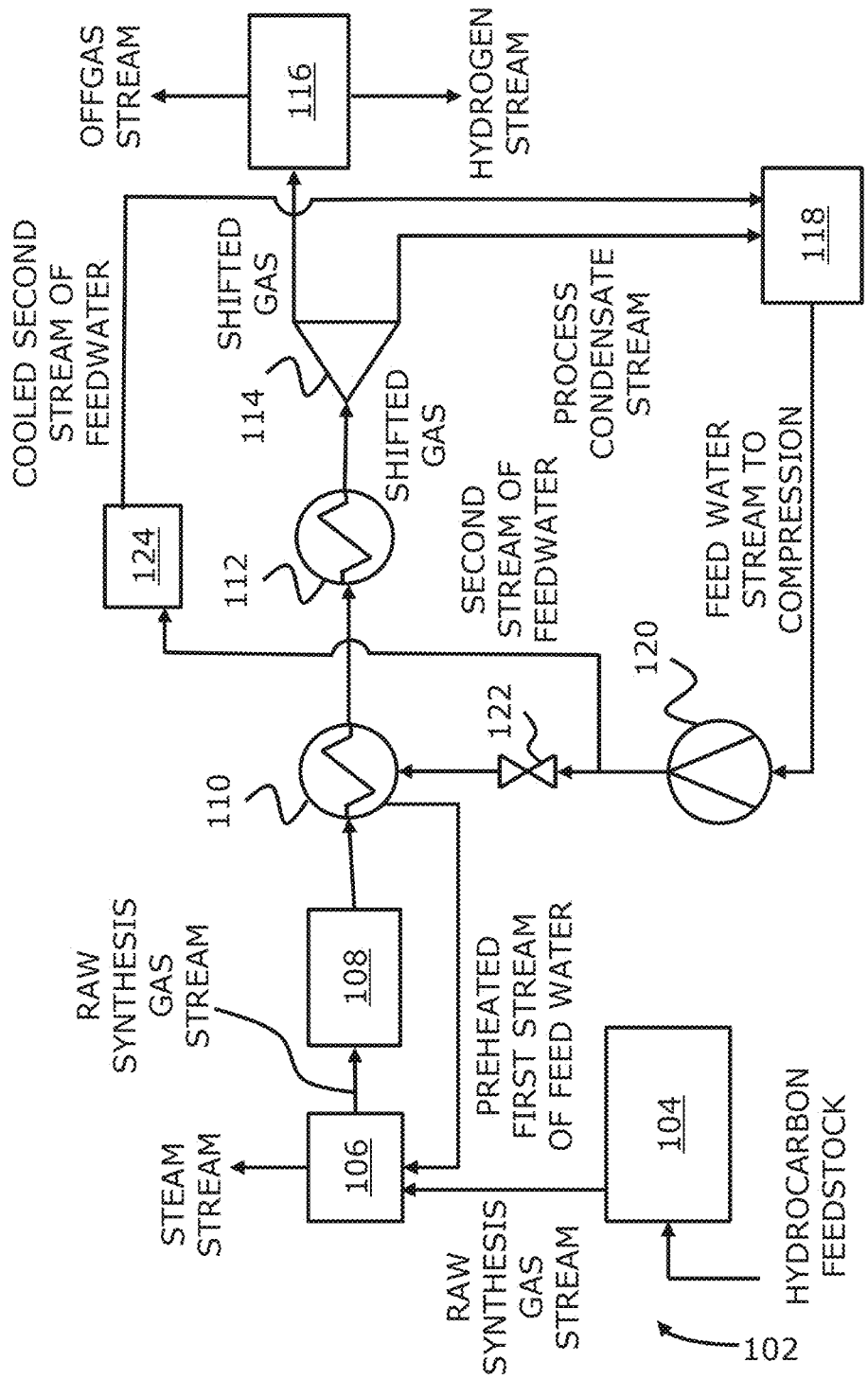
FIG. 3A is a schematic illustration of a second configuration of the apparatus of FIG. 1 for co-generating electricity in a process plant using feedwater according to an embodiment of the present disclosure.
Figure 3B:
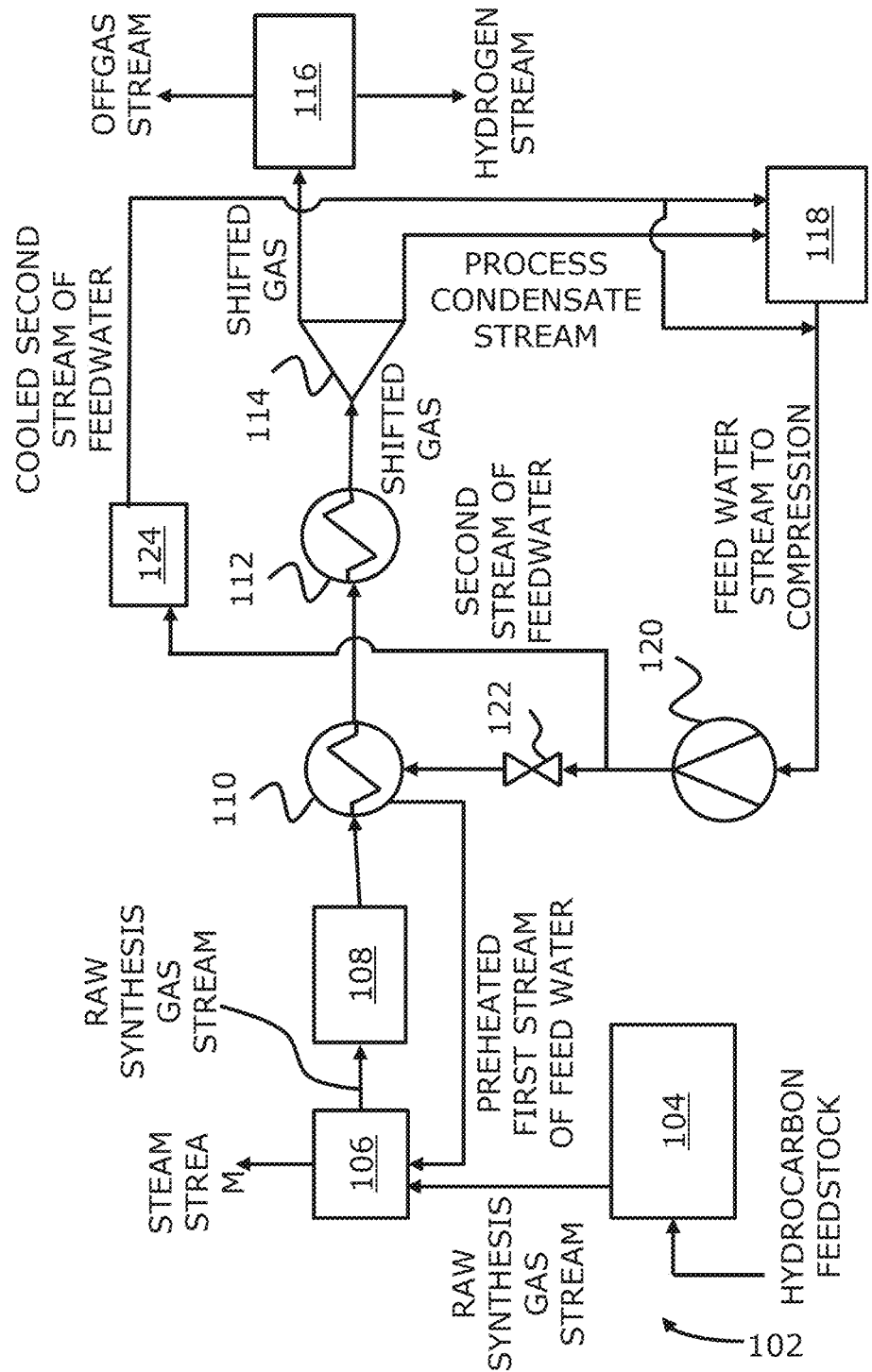
FIG. 3B is a schematic illustration of a second configuration of the apparatus of FIG. 1 for co-generating electricity in a process plant using feedwater according to an embodiment of the present disclosure.

FIG. 3A illustrates a first variation of the second configuration of the apparatus 102 according to an embodiment of the present disclosure. In the first variation, the apparatus 102 is configured to route at least a portion of the cooled second stream of feedwater returning from the thermal power generator 124 directly to the feedwater generation unit 118. The first stream of feedwater may be preheated using the hot synthesis gas stream to obtain a preheated first stream of feedwater that is routed to the steam generator 106, FIG. 3B illustrates a second variation of the second configuration of the apparatus 102 according to an embodiment of the present disclosure. In the second variation, the apparatus 102 is configured to route at least a portion of the cooled second stream of feedwater returning from the thermal power generator 124 directly to a suction side of the pump 120. The first stream of feedwater may be preheated using the hot synthesis gas stream to obtain a preheated first stream of feedwater that is routed to the steam generator 106.

Figure 3C:
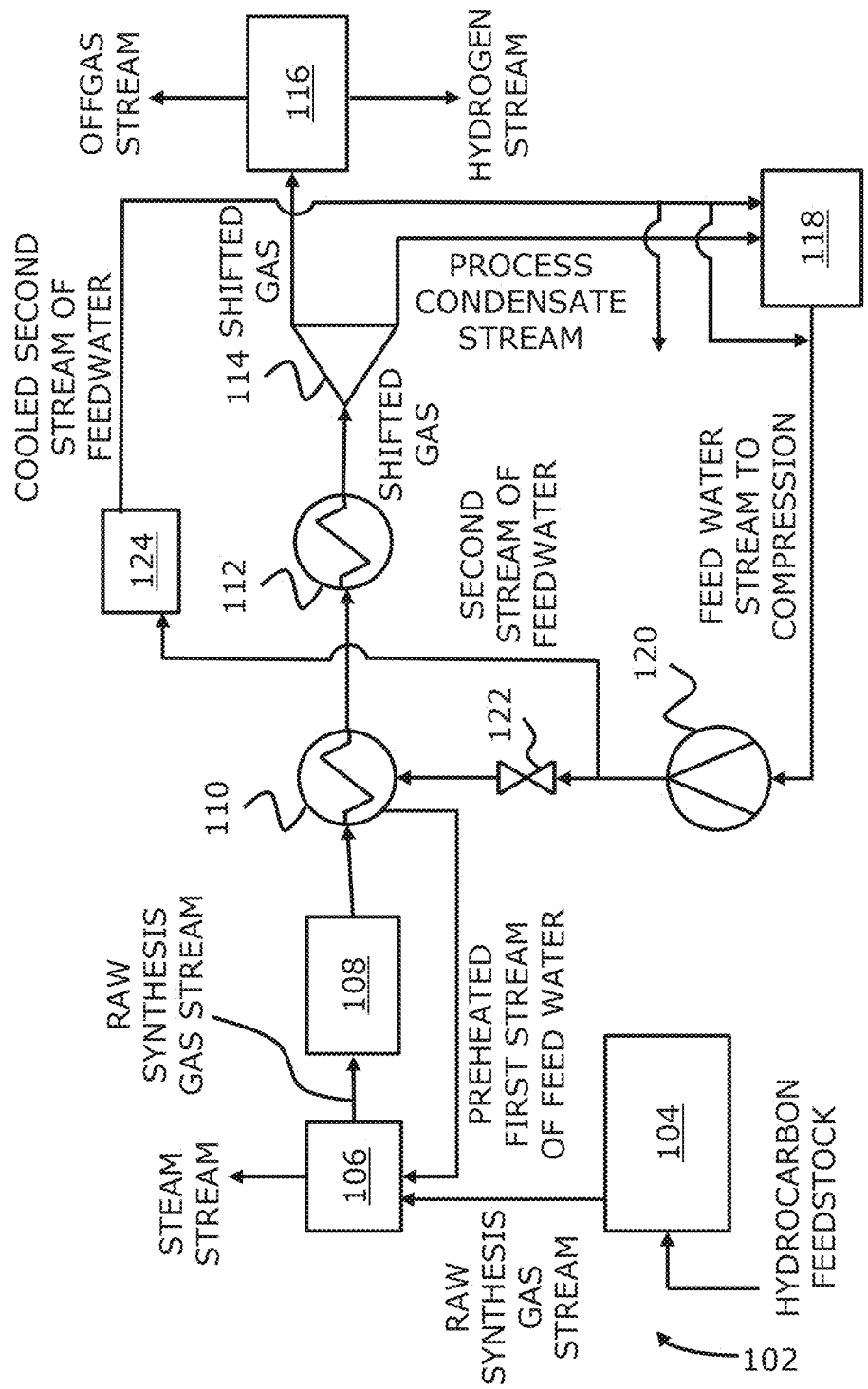
FIG. 3C is a schematic illustration of a second configuration of the apparatus of FIG. 1 for co-generating electricity in a process plant using feedwater according to an embodiment of the present disclosure.

FIG. 3C illustrates a third variation of the second configuration of the apparatus 102 according to an embodiment of the present disclosure. In the third variation, the apparatus 102 is configured to route at least a portion of the cooled second stream of feedwater returning from the thermal power generator 124 directly to any other water consumer unit. At least the portion of the cooled second stream of feedwater may be admixed upstream in the pump 120 that provides feedwater compression.

Figure 3D:
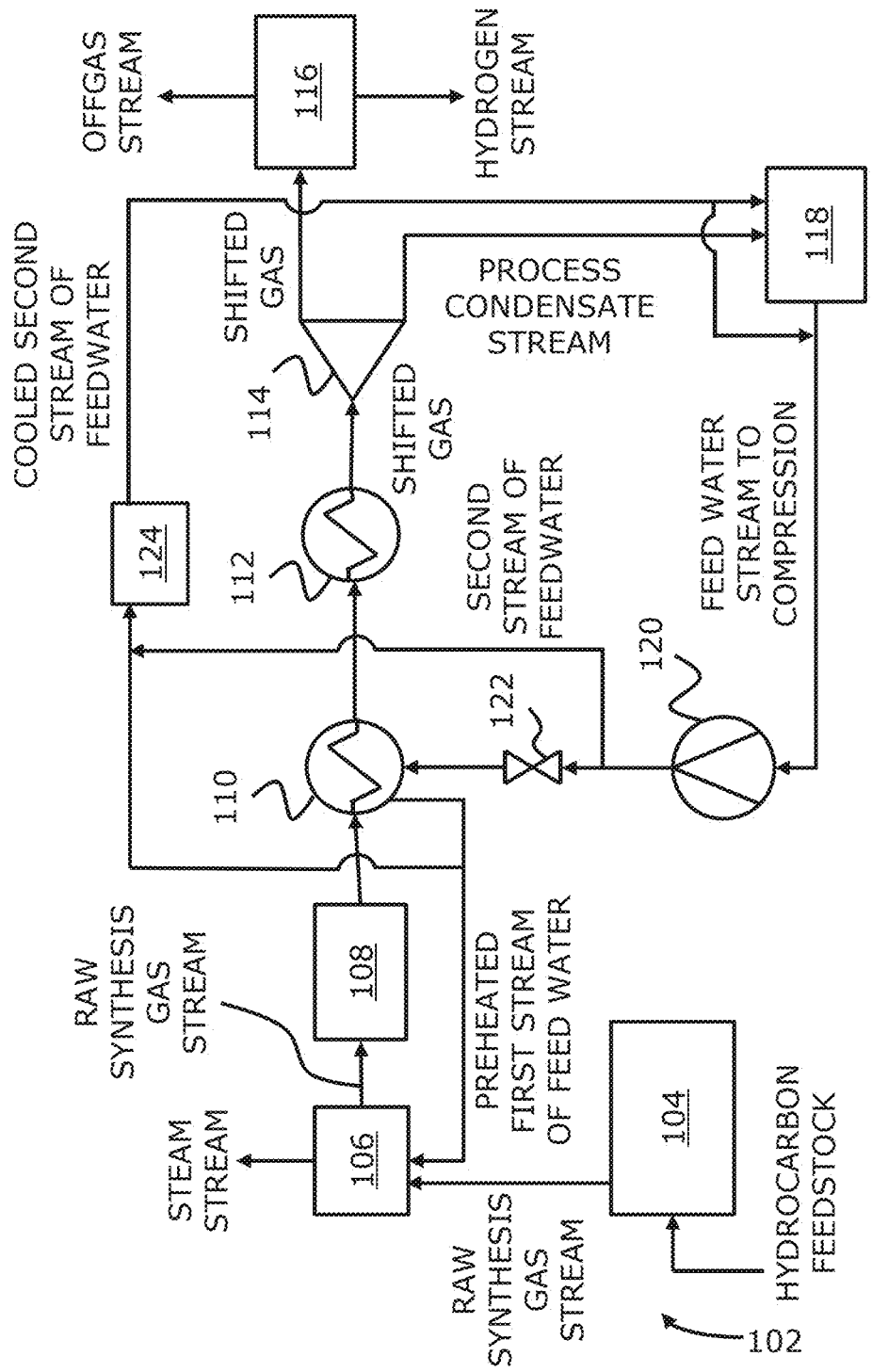
FIG. 3D is a schematic illustration of a second configuration of the apparatus of FIG. 1 for co-generating electricity in a process plant using feedwater according to an embodiment of the present disclosure.

Optionally, at least the portion of the second stream of feedwater returning from the thermal power generator 124 is directly routed to the feedwater generation unit 118, suction side of the pump 120 and any other water consumer unit. The first stream of feedwater may be preheated using the hot synthesis gas stream to obtain a preheated first stream of feedwater that is routed to the steam generator 106, FIG. 3D illustrates a fourth variation of the second configuration of the apparatus 102 according to an embodiment of the present disclosure. In the fourth variation, the apparatus 102 is configured to (i) preheat, by the preheater 110, at least a portion of the compressed pressurized first stream of feedwater using the hot synthesis gas stream to obtain a preheated first stream of feedwater, and (ii) route at least a part of the preheated first stream of feedwater to the thermal power generator 124 for heat transfer and for electricity generation. Optionally, the remaining part of the preheated first stream of feedwater is routed to the steam generation 106. The cooled second stream of feedwater is directed to at least one of the feedwater generation unit 118, the suction side of the pump 120 or any other water consumer unit. At least a portion of a preheated first stream of feedwater may be sent to the thermal power generator 124 for performing heat transfer.

Figure 3E:
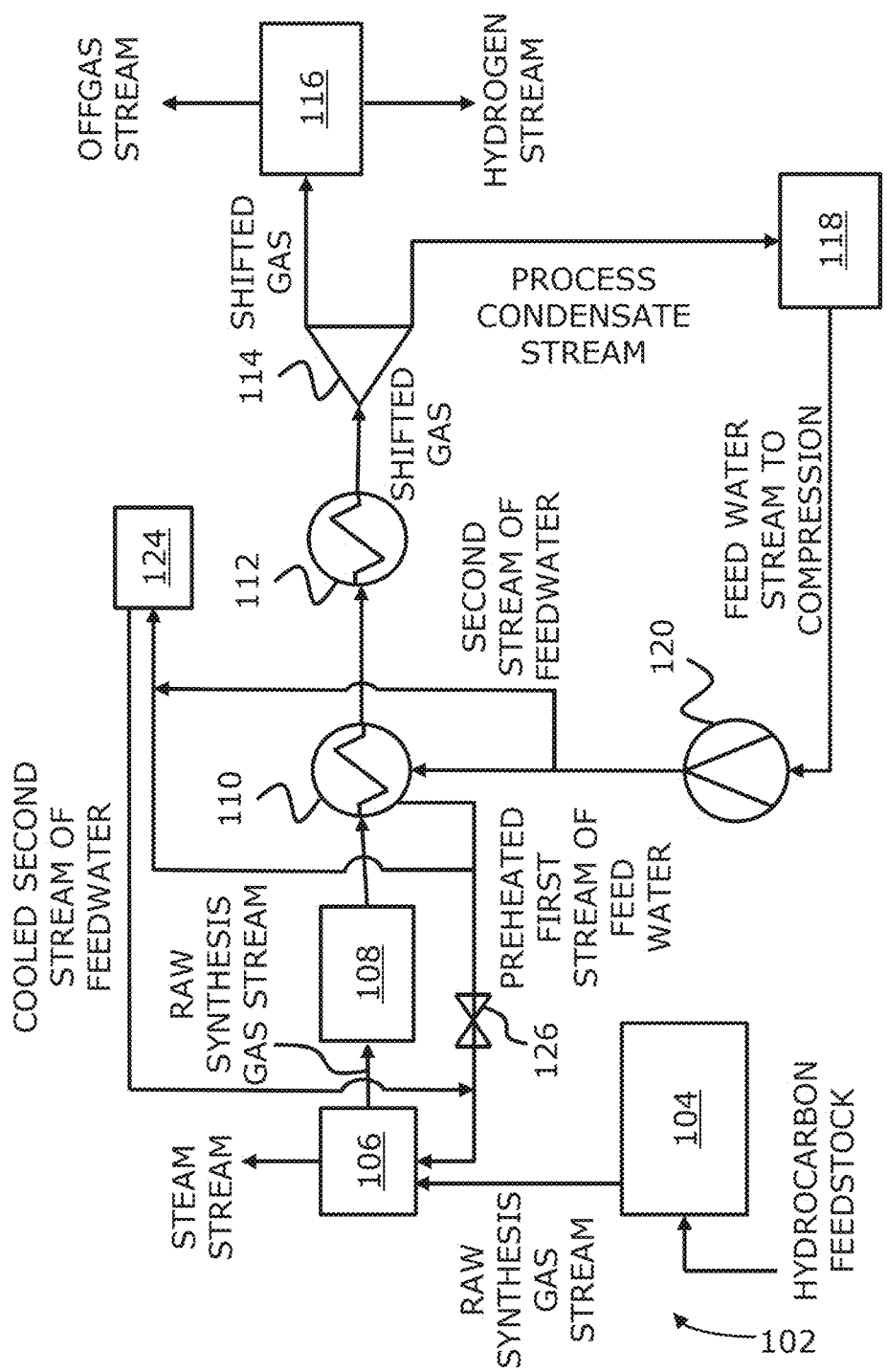
FIG. 3E is a schematic illustration of a second configuration of the apparatus of FIG. 1 for co-generating electricity in a process plant using feedwater according to an embodiment of the present disclosure.

FIG. 3E illustrates a fifth variation of the second configuration of the apparatus 102 according to an embodiment of the present disclosure. In the fifth variation, the apparatus 102 is configured to (i) preheat, by the preheater 110, a first stream of feedwater using the hot synthesis gas stream to obtain a preheated first stream of feedwater, and (ii) route at least a part of the preheated first stream of feedwater to the thermal power generator 124 for heat transfer and for electricity generation. The apparatus 102 optionally includes a control valve 126. Optionally, the split between the portions of the preheated first stream of feedwater being routed to the thermal power generator 124 and/or to the steam generation 106 is adjusted by setting the control valve 126 accordingly. The remaining portion of the preheated first stream of feedwater may be directed to the steam generator 106. The cooled second stream of feedwater is directly routed to the steam generator 106.

Figure 3F:
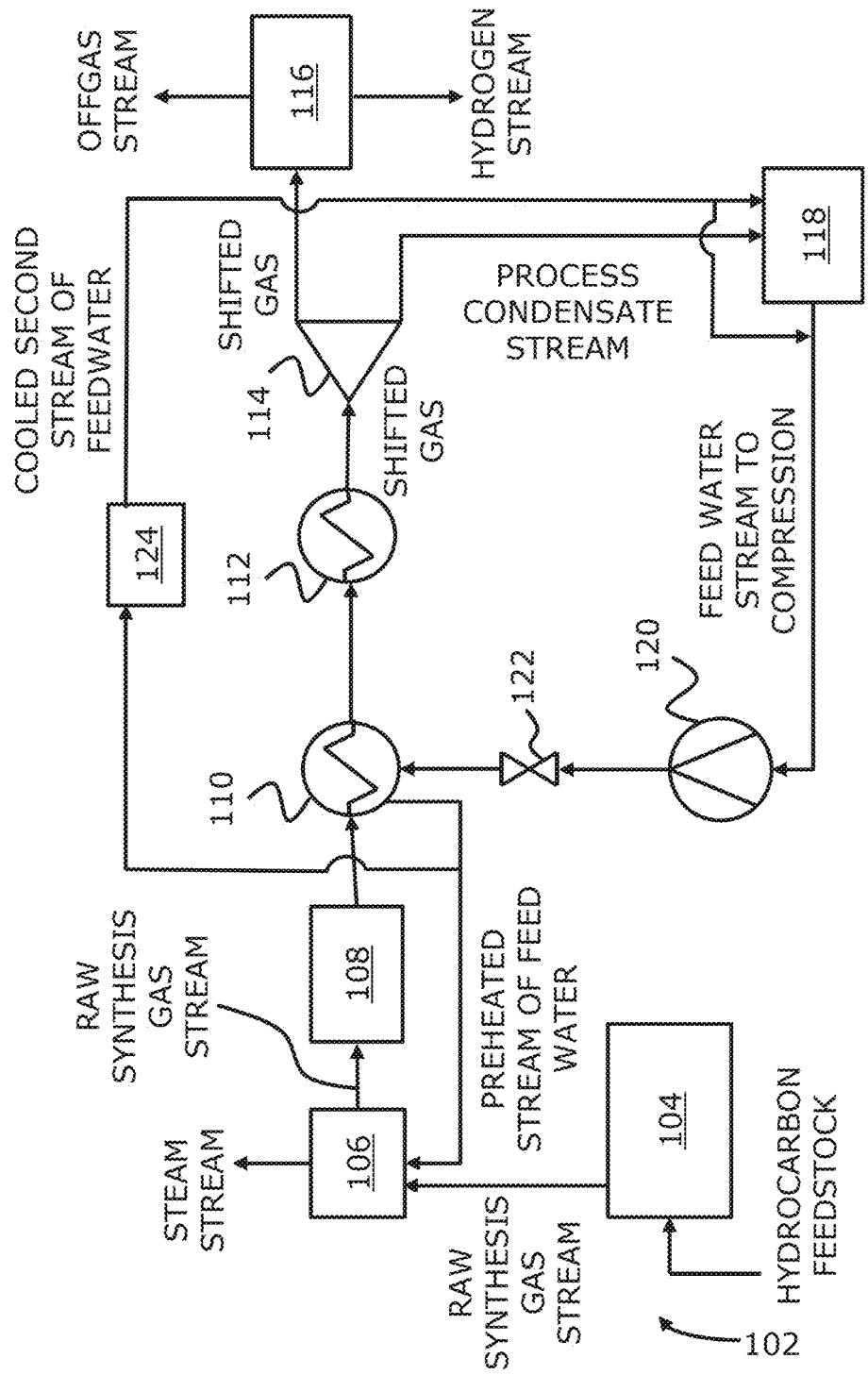
FIG. 3F is a schematic illustration of a second configuration of the apparatus of FIG. 1 for co-generating electricity in a process plant using feedwater according to an embodiment of the present disclosure.

FIG. 3F illustrates a sixth variation of the second configuration of the apparatus 102 according to an embodiment of the present disclosure. In the sixth variation, the apparatus 102 is configured to obtain the pressurized stream of hot feedwater from the feedwater generation unit 118 of the process plant and compress, using the pump 120, the pressurized stream of hot feedwater. The apparatus 102 preheats, using the preheater 110, the compressed stream of feedwater using the hot synthesis gas stream to obtain a preheated stream of feedwater and routes at least a part of the preheated stream of feedwater to the thermal power generator 124. The apparatus 102 cools the preheated stream of feedwater against the process fluid that is used in the thermal power generator 124 to produce heat in the thermal power generator 124 for co-generating the electricity and to obtain the cooled stream of feedwater. The remaining portion of the preheated stream of feedwater may be directed to the steam generator 106. The cooled stream of feedwater may be routed to feedwater generation unit 118 or the suction side of the pump 120 or other water consumer unit.

Figure 4:
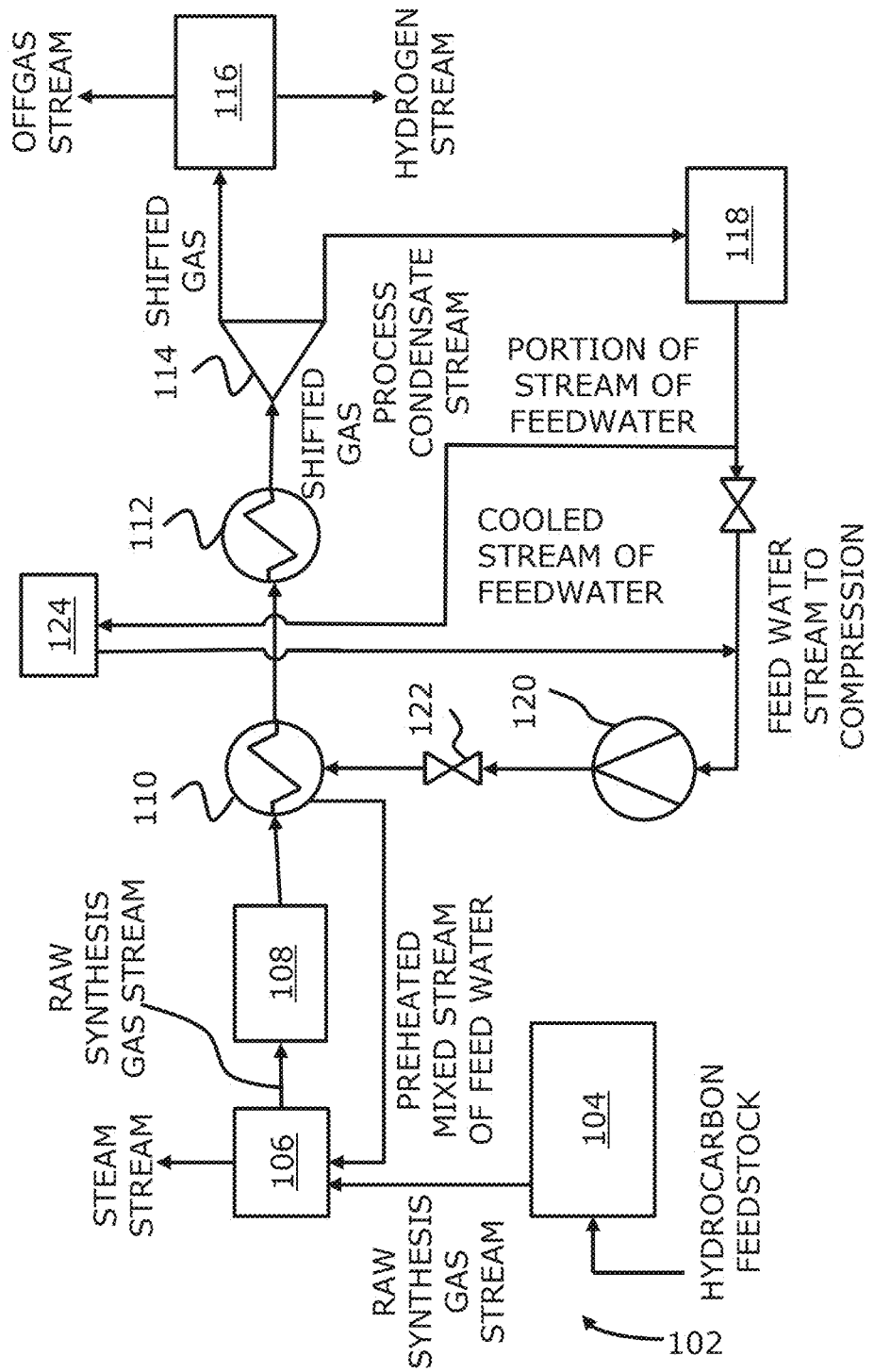
FIG. 4 is a schematic illustration of a third configuration of the apparatus of FIG. 1 for co-generating electricity in a process plant using feedwater according to an embodiment of the present disclosure.

FIG. 4 is a schematic illustration of a third configuration of the apparatus 102 of FIG. 1 for co-generating electricity in a process plant using feedwater according to an embodiment of the present disclosure. In the third configuration, the apparatus 102 is configured to route at least a portion of the stream of hot feedwater as heat carrier stream before compression towards the thermal power generator 124 for electricity generation and to obtain a cooled stream feedwater. The cooled stream feedwater from the thermal power generator 124 is sent to the suction side of the pump 120 to obtain a mixed stream of feedwater. Optionally, the apparatus 102 is configured to compress and/or convey, using the pump 120, the mixed stream of feedwater and preheat, using the preheater 110, the compressed mixed stream of feedwater. The apparatus 102 routes the preheated mixed stream of feedwater to the steam generator 106. Optionally, the feedwater generation unit 118 may operate at an elevated pressure to allow for an additional pressure drop.

Figure 5A:
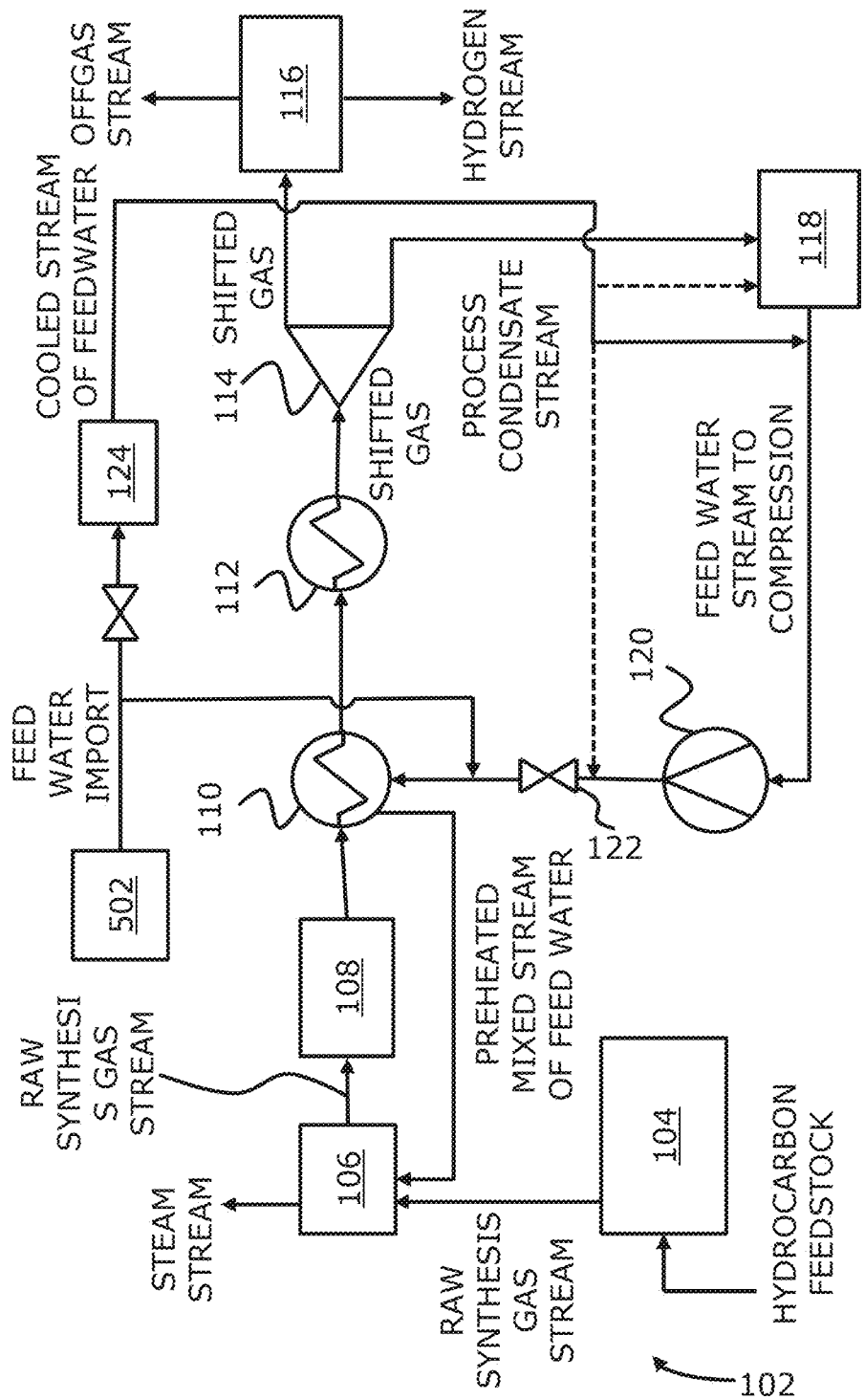
FIG. 5A is a schematic illustration of a fourth configuration of the apparatus of FIG. 1 for co-generating electricity in a process plant using feedwater according to an embodiment of the present disclosure.
Figure 5B:
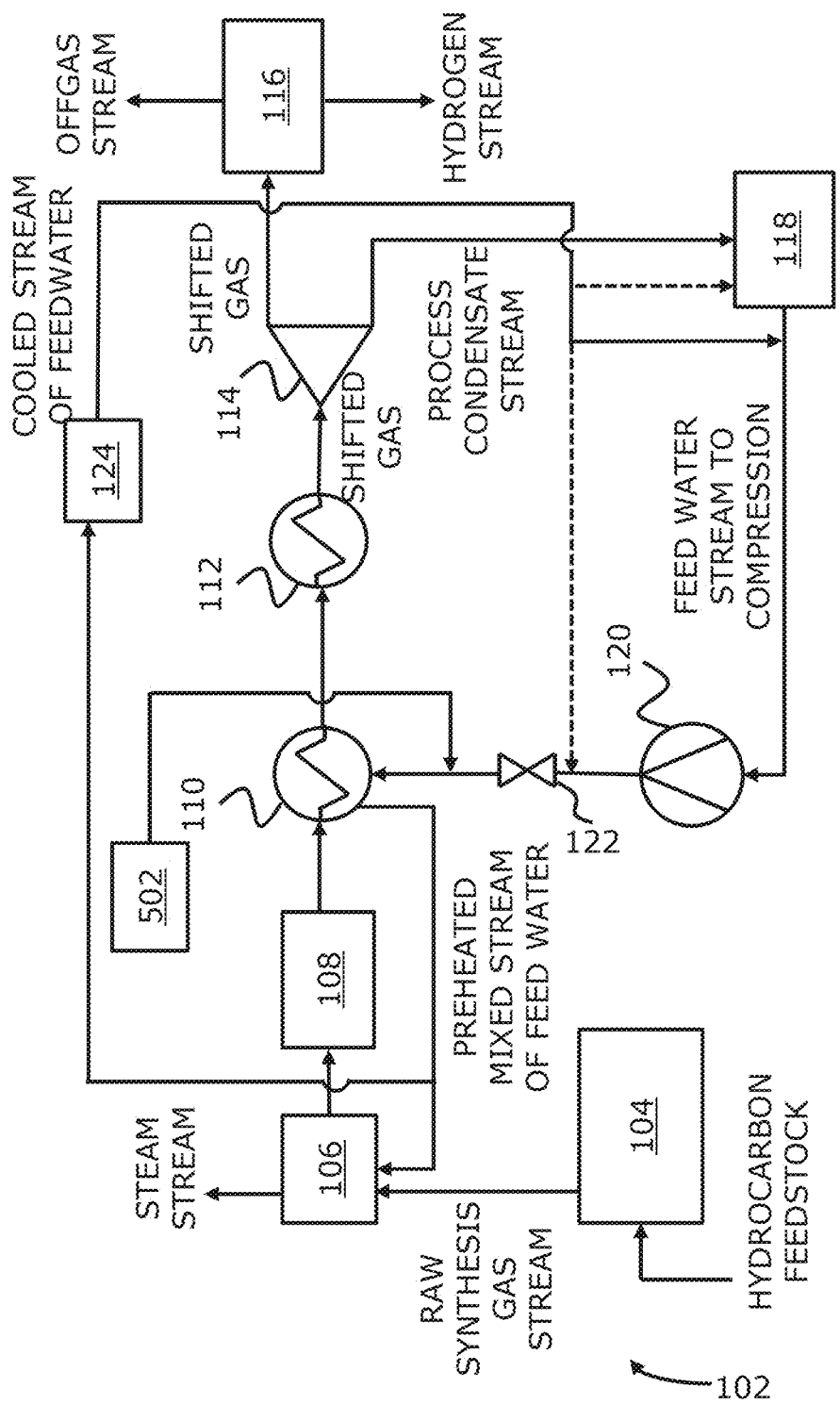
FIG. 5*b* is a schematic illustration of a fourth configuration of the apparatus of FIG. 1 for co-generating electricity in a process plant using feedwater according to an embodiment of the present disclosure.

FIGS. 5A-B are schematic illustrations of a fourth configuration of the apparatus 102 of FIG. 1 for co-generating electricity in a process plant using feedwater according to an embodiment of the present disclosure. In the fourth configuration of the apparatus 102, the feedwater preparation may occur outside of process plant in an external feedwater generator 502.

FIG. 5A illustrates a first variation of the fourth configuration of the apparatus 102 according to an embodiment of the present disclosure. In the first variation, the apparatus 102 is configured to import a pressurized stream of hot feedwater with a suitable temperature to a reforming process, from the external feedwater generator 502 and send at least a portion of the pressurized stream of hot feedwater directly to the thermal power generator 124 for heat transfer. The pressurized stream of hot feedwater may possess a temperature of at minimum 60° C. The thermal power generator 124 provides a cooled stream of feedwater that may be used as cooling media of syngas in the preheater 110, The cooled stream of feedwater may be preheated using either (a) the hot synthesis gas stream or (b) the hot flue gas stream to obtain a preheated feedwater stream. The preheated feedwater stream may be imported for steam generation in the steam generator 106. The cooled feedwater stream may have lower pressure than the pressurized stream of hot feedwater.

The imported pressurized stream of hot feedwater may not be at suitable temperature level for the thermal power generator 124 and additional preheating may be required, Such additional heating may be performed in the preheater 110.

Optionally, the apparatus 102 is configured to import a preheated first stream of feedwater, having a lower pressure than the pressurized stream of hot feedwater, to the reforming process, and send at least a portion of the preheated first stream of feedwater to the thermal power generator 124 for heat transfer.

FIG. 5B illustrates a second variation of the fourth configuration of the apparatus 102 according to an embodiment of the present disclosure. In the second variation, the apparatus 102 is configured to import pressurized stream of hot feedwater from the external feedwater generator 502 and route the imported pressurized stream of hot feedwater to the preheater 110. The apparatus 102 preheats, in the preheater 110, the pressurized stream of hot feedwater by cooling the hot synthesis gas stream to obtain a preheated feedwater stream. The apparatus 102 routes at least a portion of preheated feedwater stream to the thermal power generator 124 for heat transfer and to obtain a cooled stream of feedwater. The cooled stream of feedwater from the thermal power generator 124 is admixed with the pressurized stream of hot feedwater from the feedwater generation unit 118 or a feedwater stream from the pump 120 to obtain a mixed stream of feedwater. Optionally, the cooled stream of feedwater is sent to the feedwater generation unit 118. Optionally, the mixed stream of feedwater is preheated in the preheater 110 and at least a portion of the preheated stream of feedwater is directed to the steam generation 106 or the thermal power generator 124.

Figure 6:
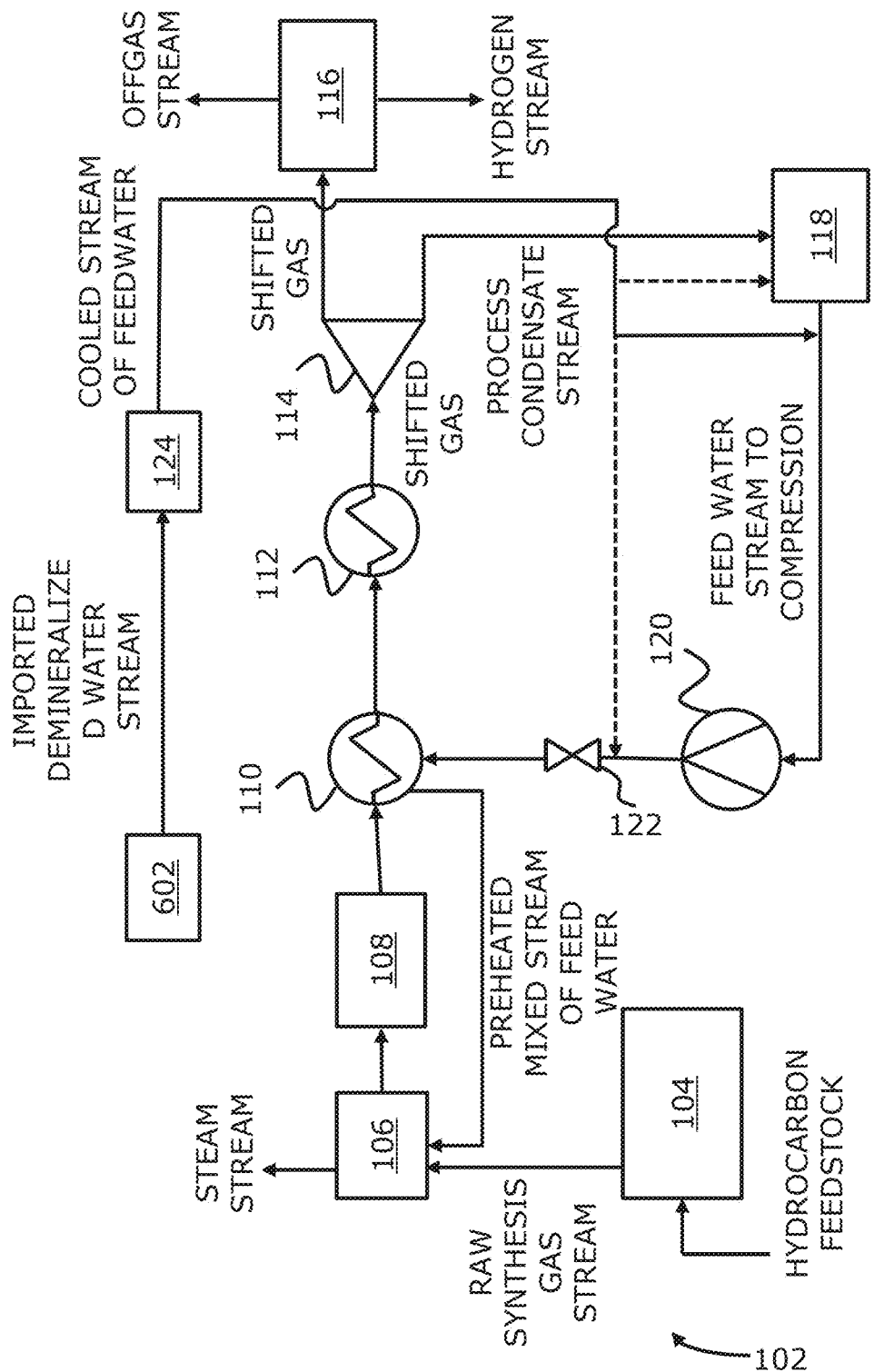
FIG. 6 is a schematic illustration of a fifth configuration of the apparatus of FIG. 1 for co-generating electricity in a process plant using feedwater according to an embodiment of the present disclosure.

FIG. 6 is a schematic illustration of a fifth configuration of the apparatus 102 of FIG. 1 for co-generating electricity in a process plant using feedwater according to an embodiment of the present disclosure. In the fifth configuration, the apparatus 102 is configured to import demineralized feedwater stream from an external demineralized water generator 602 outside the process plant, and routes at least a portion of the import demineralized feedwater stream to the thermal power generator 124 for electricity generation and to obtain a cooled demineralized feedwater stream. The imported demineralized water stream provides a temperature level suitable for the thermal power generator 124, The imported demineralized water stream may possess a temperature of minimum 60° C. The cooled demineralized feedwater stream from the thermal power generator 124 is admixed with the pressurized stream of hot feedwater from the feedwater generation unit 118 or a feedwater stream from the pump 120, to obtain a mixed stream of feedwater. Optionally, the cooled demineralized feedwater stream is sent to the feedwater generation unit 118. Optionally, the mixed stream of feedwater is preheated in the preheater 110 and the preheated mixed stream of feedwater is directed to the steam generation 106.

Figure 7:
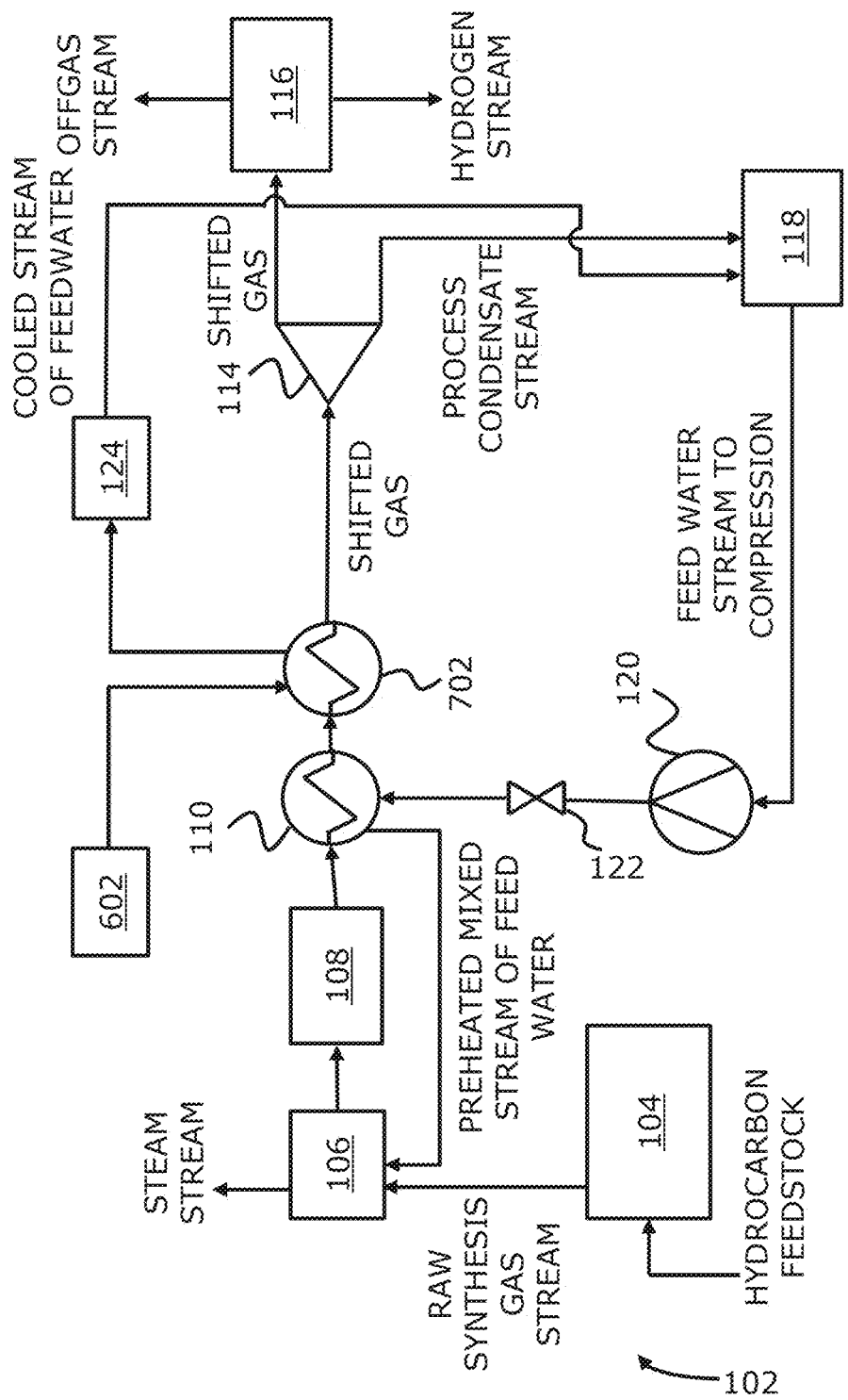
FIG. 7 is a schematic illustration of a sixth configuration of the apparatus of FIG. 1 for co-generating electricity in a process plant using feedwater according to an embodiment of the present disclosure.
Figure 8:
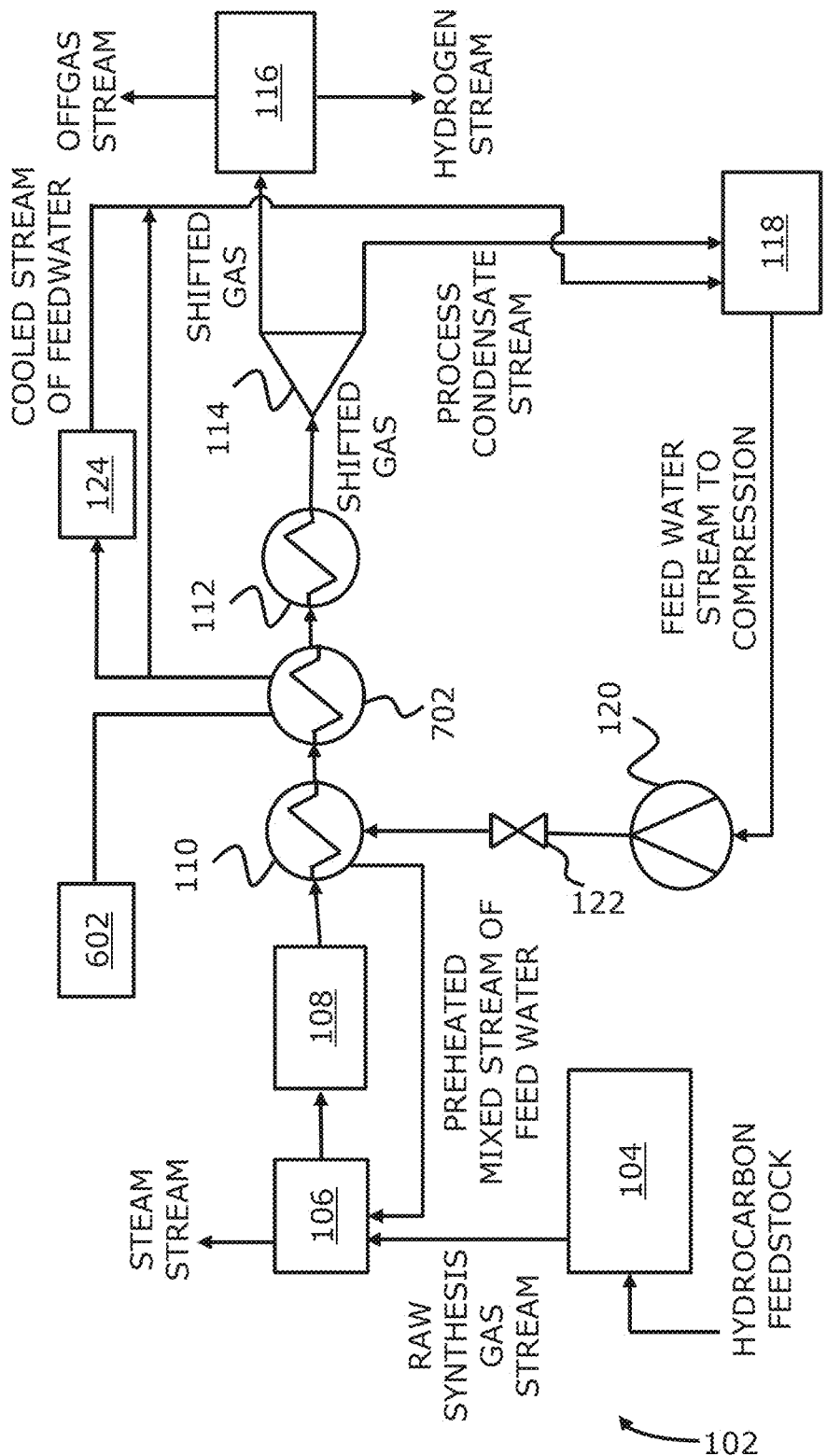
FIG. 8 is a schematic illustration of a seventh configuration of the apparatus of FIG. 1 for co-generating electricity in a process plant using feedwater according to an embodiment of the present disclosure.

FIG. 7 is a schematic illustration of a sixth configuration of the apparatus 102 of FIG. 1 for co-generating electricity in a process plant using feedwater according to an embodiment of the present disclosure. In the sixth configuration, the apparatus 102 is configured to import demineralized feedwater stream from an external demineralized water generator 602 outside the process plant. The apparatus 102 routes the import demineralized feedwater stream to a demineralized water preheater 702 for preheating the demineralized feedwater stream using the hot synthesis gas stream from the preheater 110, to obtain preheated demineralized feedwater stream and a cooled synthesis gas stream. The apparatus 102 routes at least a portion of the preheated demineralized feedwater stream to the thermal power generator 124 for electricity generation and to obtain a cooled stream of feedwater. The imported demineralized water stream may not at suitable temperature level such that the imported demineralized water stream is preheated. In the sixth configuration, the syngas cooler 112 is obsolete. ii FIG. 8 is a schematic illustration of a seventh configuration of the apparatus 102 of FIG. 1 for co-generating electricity in a process plant using feedwater according to an embodiment of the present disclosure. In the seventh configuration, the apparatus 102 is configured to import demineralized feedwater stream from an external demineralized water generator 602 outside the process plant. The apparatus 102 routes the import demineralized feedwater stream to a demineralized water preheater 702 for preheating the demineralized feedwater stream using the hot synthesis gas stream from the preheater 110, to obtain preheated demineralized feedwater stream and a cooled synthesis gas stream. The apparatus 102 routes at least a portion of the preheated demineralized feedwater stream to the thermal power generator 124 for electricity generation and to obtain a cooled stream of feedwater. Optionally, a portion of the preheated demineralized feedwater stream is sent to the feedwater generation unit 118. The demineralized water preheater 702 is located between the preheater 110 and the syngas cooler 112. Optionally, temperature of the synthesis gas outlet connected to the demineralized water preheater 702 is reduced to a level suitable for a pressure swing adsorption process, using the syngas cooler 112. The cooled stream of feedwater from the thermal power generator 124 may be directed to the feedwater generation unit 118.

Figure 9:
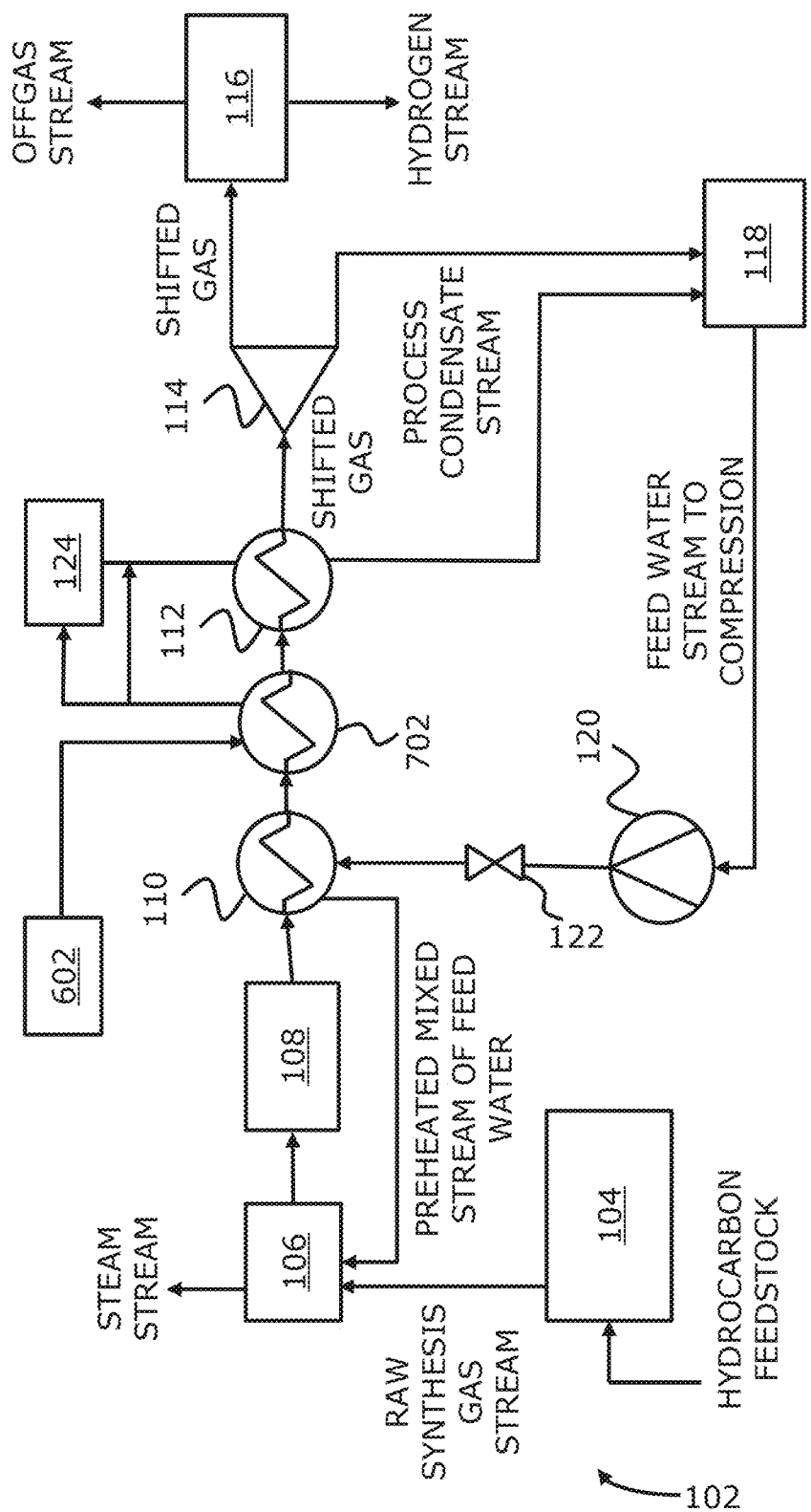
FIG. 9 is a schematic illustration of an eighth configuration of the apparatus of FIG. 1 for co-generating electricity in a process plant using feedwater according to an embodiment of the present disclosure.

FIG. 9 is a schematic illustration of an eighth configuration of the apparatus 102 of FIG. 1 for co-generating electricity in a process plant using feedwater according to an embodiment of the present disclosure. In the eighth configuration, the apparatus 102 is configured to import demineralized feedwater stream from an external demineralized water generator 602 outside the process plant. The apparatus 102 routes the import demineralized feedwater stream to a demineralized water preheater 702 for preheating the demineralized feedwater stream using the hot synthesis gas stream from the preheater 110, to obtain preheated demineralized feedwater stream and a cooled synthesis gas stream. The apparatus 102 routes at least a portion of the preheated demineralized feedwater stream to the thermal power generator 124 for electricity generation and to obtain a cooled stream of feedwater. Optionally, the cooled stream of feedwater is directed to the syngas cooler 112 as a cooling media for cooling the synthesis gas.

Optionally, the steam stream produced in the embodiments or configurations shown in the figures may at least partially be used as process steam and/or moderator steam in a synthesis gas generation process reforming process like steam reforming, autothermal reforming, partial oxidation, or any mixture of the aforementioned synthesis gas generation processes.

Modifications to embodiments of the present disclosure described in the foregoing are possible without departing from the scope of the present disclosure as defined by the accompanying claims, Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural.

LIST OF REFERENCE NUMERALS

102—apparatus
104—syngas generator
106—steam generator
108—water gas shift reactor
110—preheater
112—syngas cooler
114—condensate separator
116—hydrogen recovery unit
118—feedwater generation unit
120—pump
122, 126—control valve
124—thermal power generator
502—external feedwater generation unit
602—external demineralized water generator
702—demineralized water preheater

What is claimed is:

1. A method for co-generating electricity in a process plant using feedwater, wherein the process plant is integrated with a thermal power generator, the method comprising:
   obtaining a pressurized stream of hot feedwater from a feedwater generation unit of the process plant;
   compressing the pressurized stream of hot feedwater by pumping and splitting the pressurized stream of hot feedwater thereby obtaining a first stream of feedwater and a second stream of feedwater;
   routing the second stream of feedwater to the thermal power generator;
   cooling the second stream of feedwater against a process fluid that is used in the thermal power generator to generate a heat in the thermal power generator and to obtain a cooled second stream of feedwater; and
   co-generating the electricity, using the thermal power generator integrated with the process plant, using the heat.

2. The method according to claim 1, wherein the method further comprising:
   mixing at least a portion of the cooled second stream of feedwater with the first stream of feedwater to obtain a mixed stream of feedwater;
   preheating the mixed stream of feedwater using a hot synthesis gas stream to obtain a preheated mixed stream of feedwater; and
   routing the preheated mixed stream of feedwater to a steam generator of the process plant.

3. The method according to claim 1, further comprising routing a portion of the cooled second stream of feedwater to the steam generator of the process plant without prior additional heating being used.

4. The method according to claim 1, further comprising preheating the first stream of feedwater using the hot synthesis gas stream to obtain a preheated first stream of feedwater that is routed to the steam generator.

5. The method according to claim 1, further comprising preheating the first stream of feedwater using a hot flue gas stream that is obtained from a combustion process of the thermal power generator.

6. The method according to claim 2, wherein the hot synthesis gas stream is generated by at least one device, selected from the group consisting of: a steam methane reformer, an autothermal reformer, a partial oxidation (POX) reactor, or any combination of these.

7. The method according to claim 1, further comprising sending at least a portion of the cooled second stream of feedwater to the feedwater generation unit of the process plant.

8. The method according to claim 1, further comprising re-utilizing at least a portion of the cooled second stream of feedwater within a reforming process of the thermal power generator.

9. The method according to claim 1, further comprising admixing at least a portion of the cooled second stream of feedwater upstream in a pump that provides feedwater compression.

10. The method according to claim 4, further comprising sending at least a portion of the preheated first stream of feedwater to the thermal power generator for performing heat transfer.

11. The method according to claim 1, wherein the pressurized stream of hot feedwater is split into a first portion and a second portion, the method further comprising:

sending the first portion to the thermal power generator for heat transfer and to obtain the cooled second stream of feedwater; and mixing the cooled second stream of feedwater with the second portion prior to compression.

12. The method according to claim 1, further comprising:
(a) re-mixing the cooled second stream of feedwater with the pressurized stream of hot feedwater, or
(b) sending back the cooled second stream of feedwater to the feedwater generation unit.

13. The method according to claim 1, further comprising:
(i) importing the pressurized stream of hot feedwater to the reforming process from an external feedwater generation unit; and
(ii) sending at least a portion of the pressurized stream of hot feedwater to the thermal power generator for heat transfer.

14. The method according to claim 1, further comprising:
(i) importing the preheated first stream of feedwater, having a lower pressure than the pressurized stream of hot feedwater, to the reforming process, and
(ii) sending at least a portion of the preheated first stream of feedwater to the thermal power generator for heat transfer.

15. The method according to claim 1, further comprising:
preheating the cooled second stream of feedwater, having a lower pressure than the pressurized stream of hot feedwater, using either (a) the hot synthesis gas stream or (b) the hot flue gas stream to obtain a preheated stream;
importing the preheated stream to the reforming process; and
sending at least a portion of the preheated stream to the thermal power generator for heat transfer.

16. The method according to claim 1, further comprising:
(i) importing the cooled second stream of feedwater, having a lower pressure than the pressurized stream of hot feedwater, to the reforming process, and
(ii) reducing a temperature of a synthesis gas outlet connected to a demineralized water preheater to a level suitable for a pressure swing adsorption process.

17. The method according to claim 1, further comprising:
(i) importing the cooled second stream of feedwater, having a lower pressure than the pressurized stream of hot feedwater, to the reforming process, and
(ii) using at least a portion of the cooled second stream of feedwater obtained from the thermal power generator for final cooling of the hot synthesis gas stream.

18. The method according to claim 1, further comprising utilizing a hot process stream for supplying heat to the thermal power generator before the pressurized stream of hot feedwater is preheated again.

19. A method for co-generating electricity in a process plant using feedwater, wherein the process plant is integrated with a thermal power generator, the method comprising:
obtaining a pressurized stream of hot feedwater from a feedwater generation unit of the process plant;
compressing the pressurized stream of hot feedwater by pumping and splitting the pressurized stream of hot feedwater to obtain a first stream of feedwater and a second stream of feedwater, wherein the first stream of feedwater is routed to a preheater;
routing the second stream of feedwater to the thermal power generator;
cooling the second stream of feedwater against a process fluid that is used in the thermal power generator to generate a heat in the thermal power generator and to obtain a cooled second stream of feedwater;
co-generating the electricity, using the thermal power generator integrated with the process plant, using the heat;
mixing at least a portion of the cooled second stream of feedwater with the first stream of feedwater to obtain a mixed stream of feedwater;
preheating the mixed stream of feedwater using a hot synthesis gas stream to obtain a preheated mixed stream of feedwater; and
routing the preheated mixed stream of feedwater to the thermal power generator for heat transfer and for electricity generation.

20. The method according to claim 19, wherein the process plant is a synthesis gas production plant that is integrated with the thermal power generator for electricity generation.

* * * * *